United States Patent
Dubose

(10) Patent No.: US 9,783,262 B2
(45) Date of Patent: Oct. 10, 2017

(54) ELECTRIC DRIVE UNIT

(71) Applicant: Tangent Motor Company, Kenmore, WA (US)

(72) Inventor: David Dubose, Seattle, WA (US)

(73) Assignee: Tangent Motor Company, Kenmore, WA (US)

( * ) Notice: Subject to any disclaimer, the term of this patent is extended or adjusted under 35 U.S.C. 154(b) by 14 days.

(21) Appl. No.: 15/061,481

(22) Filed: Mar. 4, 2016

(65) Prior Publication Data

US 2016/0297500 A1 Oct. 13, 2016

Related U.S. Application Data

(60) Provisional application No. 62/144,044, filed on Apr. 7, 2015.

(51) Int. Cl.

| | |
|---|---|
| *F16H 1/32* | (2006.01) |
| *B62M 6/55* | (2010.01) |
| *B60L 7/10* | (2006.01) |
| *F16H 7/06* | (2006.01) |
| *F16H 7/02* | (2006.01) |
| *F16H 57/04* | (2010.01) |
| *H02K 7/116* | (2006.01) |

(Continued)

(52) U.S. Cl.
CPC ............... *B62M 6/55* (2013.01); *B60L 7/10* (2013.01); *B60L 11/007* (2013.01); *B62M 11/02* (2013.01); *F16H 7/02* (2013.01); *F16H 7/06* (2013.01); *F16H 49/001* (2013.01); *F16H 57/043* (2013.01); *F16H 57/0476* (2013.01); *H02K 7/116* (2013.01); *B60L 2200/12* (2013.01); *B60L 2220/50* (2013.01); *F16H 1/32* (2013.01); *F16H 2001/325* (2013.01); *Y02T 10/641* (2013.01)

(58) Field of Classification Search
CPC .. B62M 6/55; B62M 6/00; B62M 6/40; F16H 2001/325; F16H 57/043; F16H 49/001; F16H 2049/006; F16H 2049/008
See application file for complete search history.

(56) References Cited

U.S. PATENT DOCUMENTS

| | | |
|---|---|---|
| 4,410,060 A | 10/1983 | Cunard |
| 5,433,672 A | 7/1995 | Tanaka et al. |

(Continued)

FOREIGN PATENT DOCUMENTS

| | | |
|---|---|---|
| CN | 2058904 U | 7/1990 |
| CN | 203703018 U | 7/2014 |
| EP | 0066294 A1 | 12/1982 |

OTHER PUBLICATIONS

International Search Report issued in related PCT patent application PCT/US2016/026252 dated Jun. 24, 2016.

*Primary Examiner* — Joseph M Rocca
*Assistant Examiner* — Michael R Stabley
(74) *Attorney, Agent, or Firm* — Brad Bertoglio

(57) ABSTRACT

A lightweight, compact electric drive unit provides high reduction ratios for a bicycle, light electric vehicle or autonomous device. A cycloid gear reducer includes one or more cycloid gears within a housing. The cycloid gears interact with gear teeth on the inside surface of the housing, and ride on a cam shaft having eccentric lobes. Output pins extend through apertures in the cycloid gears, from an input carrier to an output carrier. An electric motor powers the cam shaft, while the output carrier powers a drive train.

24 Claims, 14 Drawing Sheets

(51) Int. Cl.
  *F16H 49/00* (2006.01)
  *B60L 11/00* (2006.01)
  *B62M 11/02* (2006.01)

(56) References Cited

U.S. PATENT DOCUMENTS

| | | | |
|---|---|---|---|
| 6,100,615 A * | 8/2000 | Birkestrand | B62K 23/04 |
| | | | 180/65.51 |
| 6,845,852 B2 | 1/2005 | Yokoyama et al. | |
| 6,976,551 B2 | 12/2005 | Spanski | |
| 7,766,114 B2 | 8/2010 | Lee et al. | |
| 8,475,315 B2 * | 7/2013 | Kobayashi | F16H 1/32 |
| | | | 475/162 |
| 8,590,655 B2 | 11/2013 | Chan | |
| 8,646,560 B2 | 2/2014 | Chan | |
| 8,684,122 B2 | 4/2014 | Maeno et al. | |
| 2007/0060440 A1 | 3/2007 | Lee | |
| 2011/0057412 A1 | 3/2011 | Owoc et al. | |
| 2013/0162112 A1* | 6/2013 | Loefel | B62M 6/55 |
| | | | 310/68 B |

* cited by examiner

ELECTRIC DRIVE UNIT

TECHNICAL FIELD

The present disclosure relates in general to drive units for electric motors, and in particular to a drive unit that can be used in powertrains for electric bicycles and other light electric vehicles or devices.

BACKGROUND

Electric motors are capable of very high workloads, but a tradeoff exists between torque output, electric current usage, electric motor speed and working voltage. To increase the torque output of typical electric motors, more current is required, thereby necessitating larger batteries and control equipment. In some applications, such as light electric vehicles, batteries having sufficient capacity to generate torque outputs desirable for propulsion may have a size, weight and/or cost that is disadvantageous or impractical.

It is common to use a speed reducer with electric motors to produce a more usable work output. Speed reducers multiply the input torque of the electric motor by a factor equal to the reduction ratio. A large reduction ratio reduces the amount of electrical current the motor requires to meet a desired level of torque for the application. Conventional speed reducers utilizing planetary, pinion or conventional chain reductions are typically limited to relatively low reduction ratios. For light electric vehicles, multiple stages of conventional speed reducers may be required to achieve adequate performance. However, such multi-stage reducers consume precious space, while adding undesirable weight, complexity and cost to the vehicle.

One example of a light vehicle that may be amenable to electric propulsion is a bicycle. The addition of an electric motor to assist or replace human effort on a bicycle is a relatively new field. In-wheel (hub) motors are the oldest and arguably least desirable approach, while newer systems power the pedal crankset and utilize a freewheel to disengage the pedals under electric assist. Powering the existing bicycle crankset may be desirable in that it allows the motor to use the appropriate gear for the situation as selected by the user or other system. However, a bicycle crankset is geared for human use, and is therefore geared for a relatively slow rotational speed (typically ~100 revolutions per minute). In general, electric motor efficiency increases and size decreases as the rotational speed of the motor increases, with optimal motor rotational speeds far exceeding the range in which a human can pedal. Currently available methods of electrically powering a cycle utilize common reduction strategies such as multiple stage belt/chain setups, planetary and pinion/spur gear arrangements. Single stage reduction ratios are typically 2:1 to 10:1 and cumbersome to adapt to the open nature of a cycle. With weight and size considerations being particularly critical to electric bicycle and cycle applications, overall reduction ratios are practically limited to 30:1 by combining multiple conventional stages.

SUMMARY

Methods and apparatuses for driving a light electric vehicle or autonomous device are provided. In one embodiment, an electric motor drives a cycloid gear reducer. The cycloid gear reducer includes an input carrier and an output carrier, each having an inward-oriented face with a plurality of receptacles to receive output pins. The output pins extend between the input carrier receptacles and the output carrier receptacles, and pass through output pin apertures formed in one or more cycloid gears. The cycloid gears have teeth around their peripheries, and a central aperture through which a cam shaft passes. Cycloid gear lubrication channels may extend between the gear teeth and output pin apertures.

The cam shaft may be coupled to the electric motor, or integrated with an electric motor output shaft, and includes an eccentric lobe driving each cycloid gear. The assembly is surrounded by a housing, typically cylindrical, having gear teeth on an inside surface thereof. The housing has an inner diameter that exceeds the outer diameter of the cycloid gears, such that a proper subset of the gear teeth on each cycloid gear engage the housing gear teeth at any given time. An electric motor drives the cam shaft, and the output carrier can be coupled to a drive train for, e.g., a bicycle, motorcycle, other light electric vehicle, robot, or autonomous device.

A battery pack may be connected to the electric motor. The coupling between the output carrier and the drive train may include a chain drive or a belt drive. One or more portions of the output pins may be threaded for secure engagement with the input carrier and/or the output carrier.

In some embodiments, regenerative braking may be provided. A first one way bearing or sprag clutch may be installed between an output shaft of the electric motor, and the cam shaft. A second one way bearing, having a direction of free rotation opposite that of the first one way bearing, couples the output carrier with the drive train. When not under electric power, the drive train can spin the electric motor in a reverse direction to implement regenerative braking.

In accordance with another aspect, an electrically-powered bicycle is provided. The electric drive unit can be mounted to a bicycle frame, and coupled with a bicycle drive train, such as via a chain drive or belt drive. A battery pack supplying power to the electric motor may be mounted on the bicycle frame or carried by a rider.

DETAILED DESCRIPTION OF THE DRAWINGS

Figure 1:
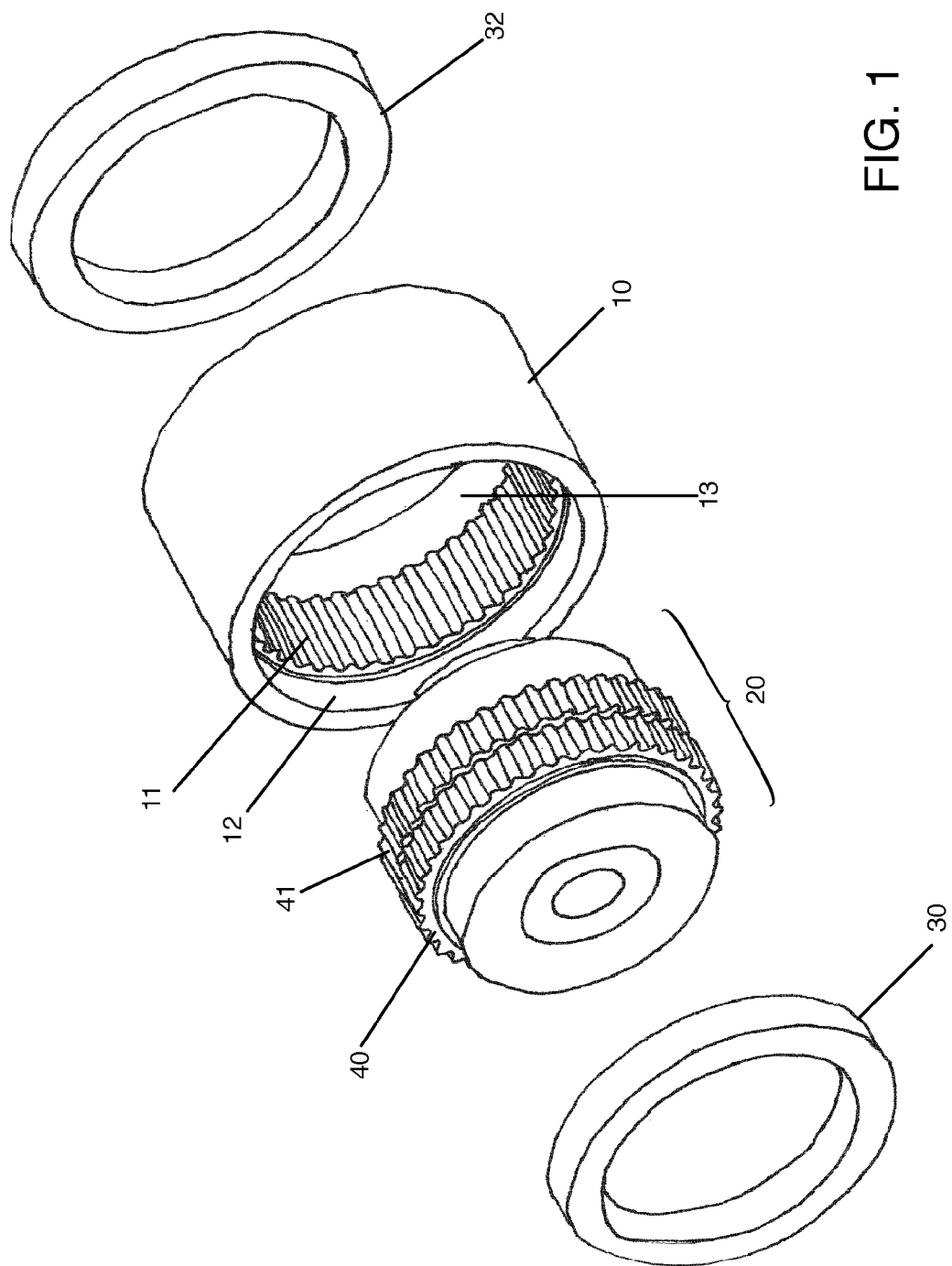
FIG. 1 is a partial exploded perspective view of drive unit components, including an eccentric cage assembly, a housing, and ball bearings arranged between them.

While this invention is susceptible to embodiment in many different forms, there are shown in the drawings and will be described in detail herein several specific embodiments, with the understanding that the present disclosure is to be considered as an exemplification of the principles of the invention to enable any person skilled in the art to make and use the invention, and is not intended to limit the invention to the embodiments illustrated.

In order to implement an electric drive unit in a light electric vehicle or other motive applications, such as an electrically-power or electrically-assisted bicycle or an electric motorcycle, it may be desirable to utilize embodiments of a cycloid reducer. However, conventional cycloid reducers may still suffer disadvantages and limitations in a lightweight electric vehicle application. Typical cycloid reducers are very precise, with little to no backlash, employing exact manufacturing tolerances which can greatly increase cost. These tolerances also limit the reduction ratio available and/or increase the unit size and weight, as all elements in contact with the cycloid gear must be rolling elements (bearings). Limitations on the physical space inside the unit thereby limit the number of gear 'teeth' available. Conventional cycloid reducers are also relatively heavy in weight, often limiting their use to heavy industrial applications.

However, a lightweight, high ratio cycloid reducer may be effectively utilized in a motive application where cost, weight, space and complexity are a concern. Such use cases include bicycles, motorcycles, wheelchairs, small autonomous electric vehicles, personal electric transportation devices and other light electric vehicles. The apparatus and methods described herein may also be beneficial in use with various robots, terrestrial drones and other electrically-powered devices.

In general, in accordance with one aspect, a drive unit is provided that includes three main elements: an electric motor, housing and eccentric assembly. The eccentric assembly and motor are both inserted into the housing and secured, creating one drive unit. The rotational force of the motor is applied to a camshaft within the eccentric assembly. Cycloid gears are mounted on the eccentric lobes of the camshaft whose rotation causes the cycloid gears' center of mass to rotate about the main axis. The geared interaction between the cycloid discs and housing cause the eccentric assembly, which acts as the drive output, to rotate at a rate equal to the number of teeth on the eccentric assembly divided by the difference in teeth between the housing and assembly. This ratio may be changed to suit the application. The motor employed is preferably a high-speed brushless electric motor such that the drive unit converts the high rotational speed of the efficient motor into a high torque output with a power band having rotational speeds suited to the application.

By combining a high efficiency, high-RPM electric motor with the drive unit, a compact, rugged and high torque output system is created. The high reduction ratio reduces the amount of electrical current required to generate the level of torque needed as an input to the vehicle transmission. Reducing the current required is advantageous because it extends vehicle range and reduces the stress on the electrical control components, allowing use of smaller batteries, cables and electronics.

The drive unit may be designed with a wide range of ratios. For electric-powered bicycle applications, a reduction ratio of approximately 40:1 may be appropriate. In prior systems, electric motors are attached directly to the vehicle transmission, necessitating unfavorable tradeoffs due to the level of torque output required of the motor. Typical vehicle transmissions are not capable of providing appropriate reduction ratios within the space and weight constraints desirable in light electric vehicles; rather, they demand large electrical currents to generate large torque within the motor. Embodiments of the drive unit described herein may be designed to provide a reduction ratio that enables a more appropriate vehicle transmission to be used (including, in some embodiments, an existing drivetrain).

In accordance with another aspect of the embodiments, the drive unit may employ a modified circular tooth profile that creates the gear mesh between the eccentric assembly and the housing and is specially designed to reduce the eccentricity of the camshaft lobes. Low eccentricity has the advantages of reducing mechanical stress, increasing the efficiency, decreasing size of the drive unit, and allowing for a large output pin pitch circle diameter.

FIG. 1 is an exploded view of a cycloid reducer, in accordance with one such embodiment. Housing 10 is cylindrical in form. A gear portion 11 of the interior surface of housing 10 is machined to have a modified circular gear tooth profile with a number of teeth n. Bearing races 12 and 13 are also formed on the inside surface of housing 10, on either side of gear portion 11. The smallest diameter portion of housing 10 is formed from the tooth profile of gear portion 11. While illustrated as a single metal component, it is contemplated and understood that in other embodiments, housing 10 could be formed from multiple pieces.

Housing 10 locates eccentric cage assembly 20 and ball bearings 30 and 32 concentrically within in. During assembly, eccentric cage assembly 20 is inserted into housing 10, causing the housing gear teeth of gear teeth portion 11 to mesh with gear teeth of eccentric assembly cycloid gears 40 and 41. Ball bearings 30 and 32 are positioned in bearing races 12 and 13, respectively, to support eccentric cage assembly 2 concentrically and locate it axially.

Figure 2:
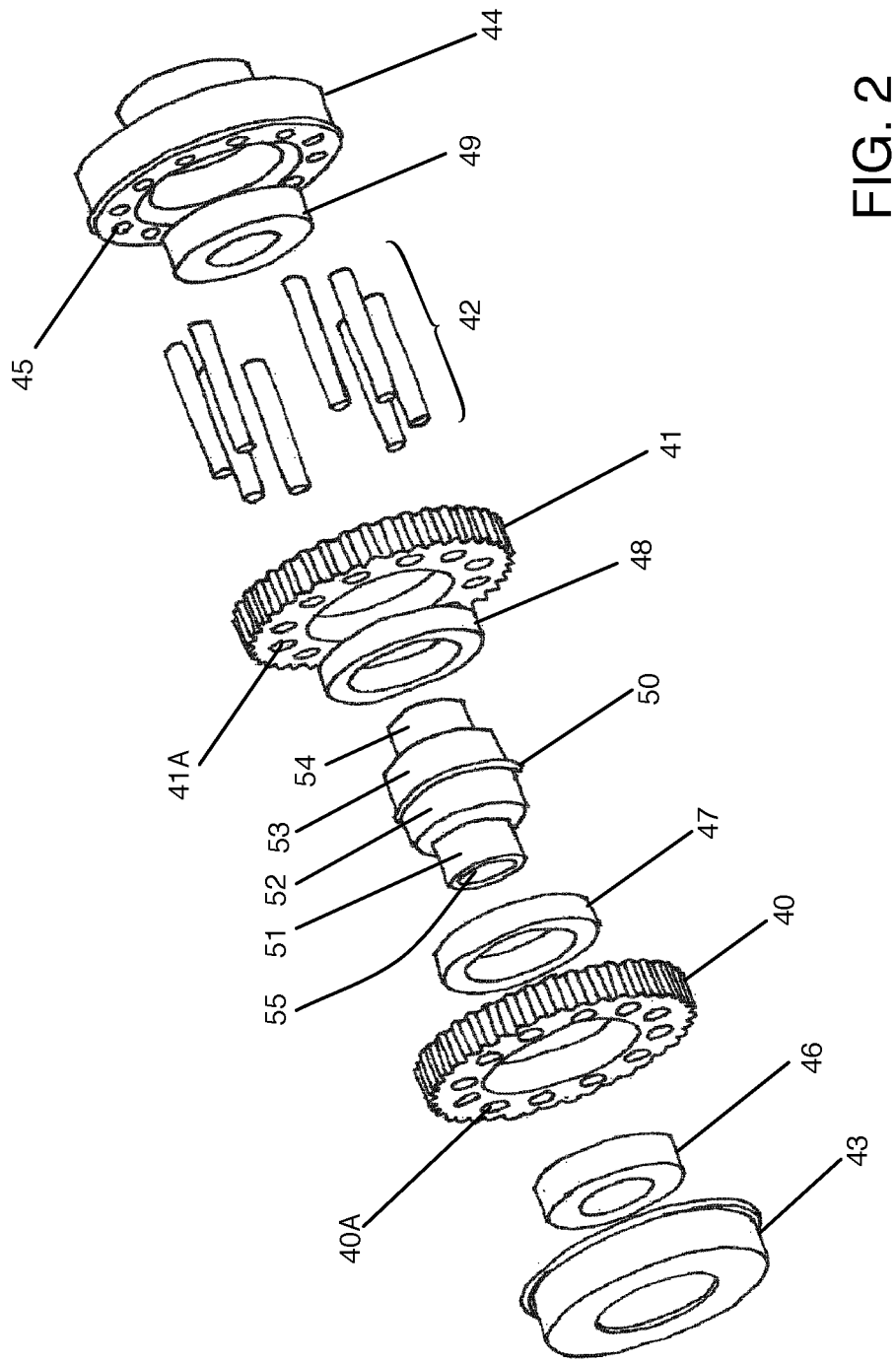
FIG. 2 is an exploded perspective view of an eccentric cage assembly.

FIG. 2 is an exploded view of eccentric cage assembly 20. Cycloid gears 40 and 41 each include gear teeth on their outside circumference, a central aperture, and a plurality of pin apertures distributed (preferably evenly) around each cycloid gear, between the central aperture and the outside gear teeth. Specifically, cycloid gear 40 includes multiple pin apertures 40A, and cycloid gear 41 includes multiple pin apertures 41A. Pin apertures 40A and 41A are oriented parallel to the central axis of eccentric cage assembly 20, and are oversized relative to the diameter of pins 42, such that pins 42 can move freely within apertures 40A and 41A during eccentric movement of cycloid gears 40 and 41 on lobes 52 and 53 of camshaft 50 (described further below). In some embodiments, lobes 52 and 53 have relative phase orientations configured to balance the camshaft. For example, an embodiment implementing a 40:1 cycloid with two lobes will preferably have lobes that are approximately 175 degrees out of phase.

While the embodiment of FIG. 2 contains two cycloid gears 40 and 41, and eight pins 42, it is contemplated and understood that other embodiments may include differing numbers of cycloid gears and/or pins. Preferably, more than one cycloid gear is used in order to balance the rotating unit, balance forces applied between the camshaft and housing (across the cycloid gears) and spread the motor load across more area. Similarly, increasing the number of pins can likewise spread the motor load across more area. Therefore, it may be desirable to maximize the number of output pins, which is aided by low eccentricity.

Preferably, the output pins 42 will pass through cycloid gears 40 and 41 at a position towards the outer diameter of each cycloid gear, while maintaining enough material around apertures 40A and 41A to allow for wear and avoid breakage of the cycloid gear. Locating the output pins at the largest diameter possible can be advantageous, in that the farther out the pins are radially, the more the forces applied to the pins by the cycloid gears are oriented tangentially to the pin surface. This greatly increases gear train efficiency and lifetime, as pins located at larger diameters relative to the cycloid gears have more favorable leverage than a smaller diameter position. The benefits of positioning the output pins as far out radially as possible within the cycloid gears can be maximized by use of a low eccentricity cam, which in turn can be enabled by using the modified circular gear tooth profile. A low eccentricity cam allows use of smaller cycloid pin apertures, thereby allowing the apertures (and therefore output pins) to be located farther towards the outside edge of the cycloid gears. Preferably, the cycloid gears have eccentricity less that 0.05 times their radius, defined as the gear pitch times the number of gear teeth. The output pin apertures preferably lie on a pitch diameter such that the cycloid apertures are less than half their diameter from the surface of the gear face, defined as the cycloid dedenda pitch diameter minus the diameter of the dedenda.

Eccentric cage assembly 20 also includes input carrier 43 and output carrier 44. Carriers 43 and 44 each feature inward-directed receptacles 45, having spacing consistent with the pin holes within cycloid gears 40 and 41 and a diameter adapted to securely accept output pins 42 with little or no radial movement. Receptacles 45 may be formed as closed cavities in the carrier face, or they may be formed as through-holes enabling insertion of output pins therethrough; although to the extent receptacles 45 are formed as through holes, preferably a mechanism will be provided to constrain the output pins therein, such as a cap or threaded engagement (as described further below). As assembled, output pins 42 extend from receptacles formed in the inward-directed face of input carrier 43, through apertures 40A and 41A in cycloid gears 40 and 41, and into receptacles formed in the inward-directed face of output carrier 44, thereby rigidly connecting input carrier 43 with output carrier 44, while enabling eccentric rotation of cycloid gears 40 and 41.

While illustrated in FIG. 2 having uniform pins, in some embodiments, it may be desirable to implement structures to secure the assembly components together once assembled. For example, one or more of output pins 42 may optionally be replaced by shoulder screws, and one or more of the receptacles within input carrier 43 and/or output carrier 44 may be internally threaded to receive one or more screws or threaded pins. Use of one or more screws or threaded pins may be desirable to securely fasten input carrier 43 to output carrier 44, creating a very robust assembly.

Camshaft 50 is mounted concentrically within input carrier 43, cycloid gears 40 and 41, and output carrier 44. Camshaft 50 rides on ball bearings 46, 47, 48, and 49. Specifically, as assembled, ball bearing 46 is mounted between camshaft input portion 51 and an inside circumference of input carrier 43. Ball bearing 47 is mounted between camshaft eccentric lobe 52 and the central aperture of cycloid gear 40. Ball bearing 48 is mounted between camshaft eccentric lobe 53 and the central aperture of cycloid gear 41. Ball bearing 49 is mounted between camshaft output portion 54 and an inside circumference of output carrier 44.

Camshaft 50 accepts input from an electric motor (shown in other figures) through a one-way clutch bearing installed within central cavity 55 of camshaft 50, or by means of a standard square or woodruff key. The electric motor shaft is installed through the center of eccentric cage assembly 20, and thus, through the center of camshaft 50.

The cycloid gears 40 and 41 are mounted on eccentric lobes 52 and 53 of camshaft 50 by means of bearings 47 and 48. Eccentric lobes 52 and 53 force the center of mass of cycloid gears 40 and 41 to rotate around the centerline of camshaft 50. Cycloid gears 40 and 41 are offset from one another by an appropriate amount for balancing of the reciprocating assembly. Pins 42 pass through cycloid gear peripheral apertures 40A and 41A parallel to the teeth of gears 40 and 41, and parallel to the center axis of camshaft 50. Peripheral cycloid gear apertures 40A and 41A are oversized relative to the diameter of pins 42 and positioned within the cycloid gears such that as camshaft 50 rotates, rotating the center of mass of the cycloid gears 40 and 41 around the axis of camshaft 50 and the central axis, pins 42 remain in fixed contact with cycloid gears 40 and 41, without interfering with camshaft 50 or any other components.

Preferably, the cycloid gears, pins and housing teeth are formed from an alloy steel with high hardness and toughness to increase efficiency and durability, such as 4140 alloy steel. The housing, input and output carriers, and camshaft may be formed from aluminum for weight savings and favorable heat transfer characteristics.

Figure 3:
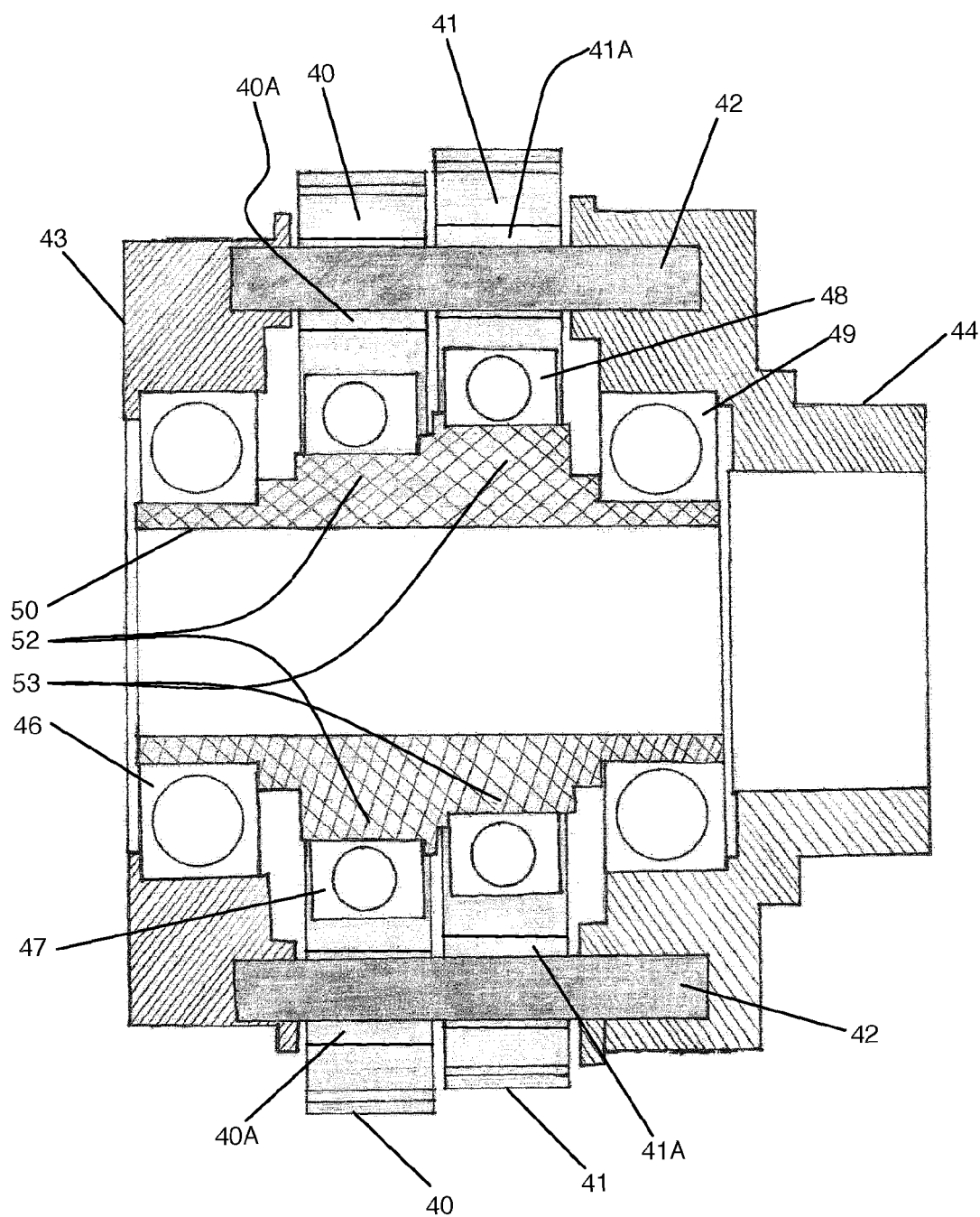
FIG. 3 is a longitudinal cross section of the eccentric cage assembly.

FIG. 3 illustrates cross-section A-A (shown in FIG. 1) of eccentric cage assembly 20 in isolation. Camshaft 50 is shown mounted within input carrier 43 and output carrier 44. On camshaft eccentric lobes 52 and 53 are mounted cycloid gears 40 and 41, respectively, protruding radially outward beyond the circumference of input carrier 43 and output carrier 44. This arrangement allows eccentric cage assembly 20 to be inserted into housing 10 as an assembled unit, increasing robustness and ease of assembly and maintenance. As illustrated, input housing 43 has a smaller diameter than output housing 44, although the opposite arrangement may also be employed, in which output housing 44 has a smaller diameter than input housing 43.

Also shown in the cross-section of FIG. 3 are pins 42, having ends inserted into input carrier 43 and output carrier 44. Pins 42 pass through apertures 40A AND 41A in cycloid gears 40 and 41, respectively. As described above, apertures 40A and 41A are oversized to allow for the eccentricity of camshaft 50 as it rotates.

Figure 4:
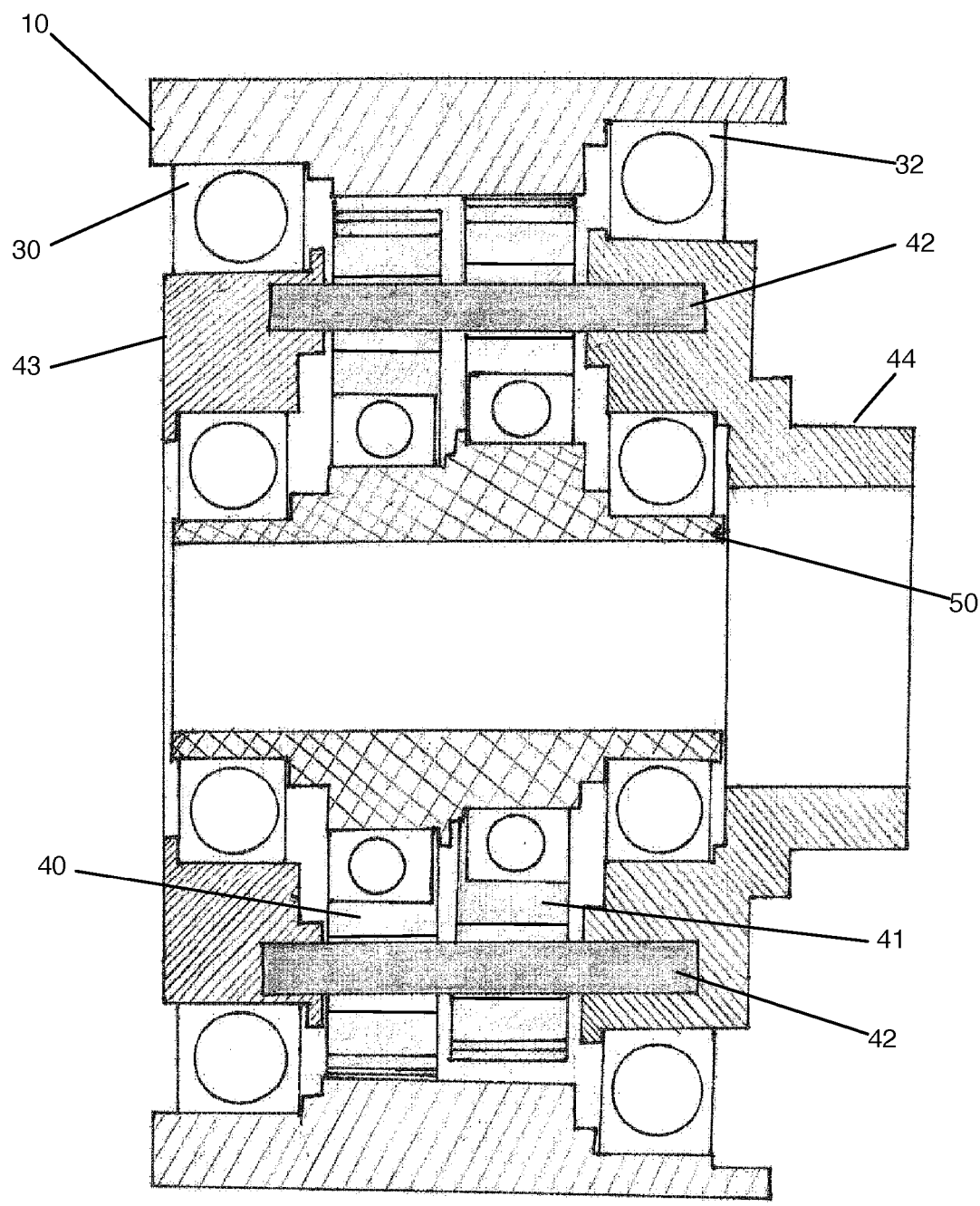
FIG. 4 is a longitudinal cross section of the eccentric assembly within a housing.

FIG. 4 is a cross section A-A of the entire mechanism of FIG. 1, as assembled, with eccentric cage assembly 20 installed into housing 10 and secured by bearings 30 and 32. FIG. 4 illustrates an exemplary clearance between the largest, outer diameters of input and output carriers 43 and 44, and the matching inner circumferences of housing 10. Ball bearings 30 and 32 are inserted between the input and output carriers and the housing, and secured using a retaining ring or other appropriate fastener (not shown) after installation of eccentric cage assembly 20.

Figure 5:
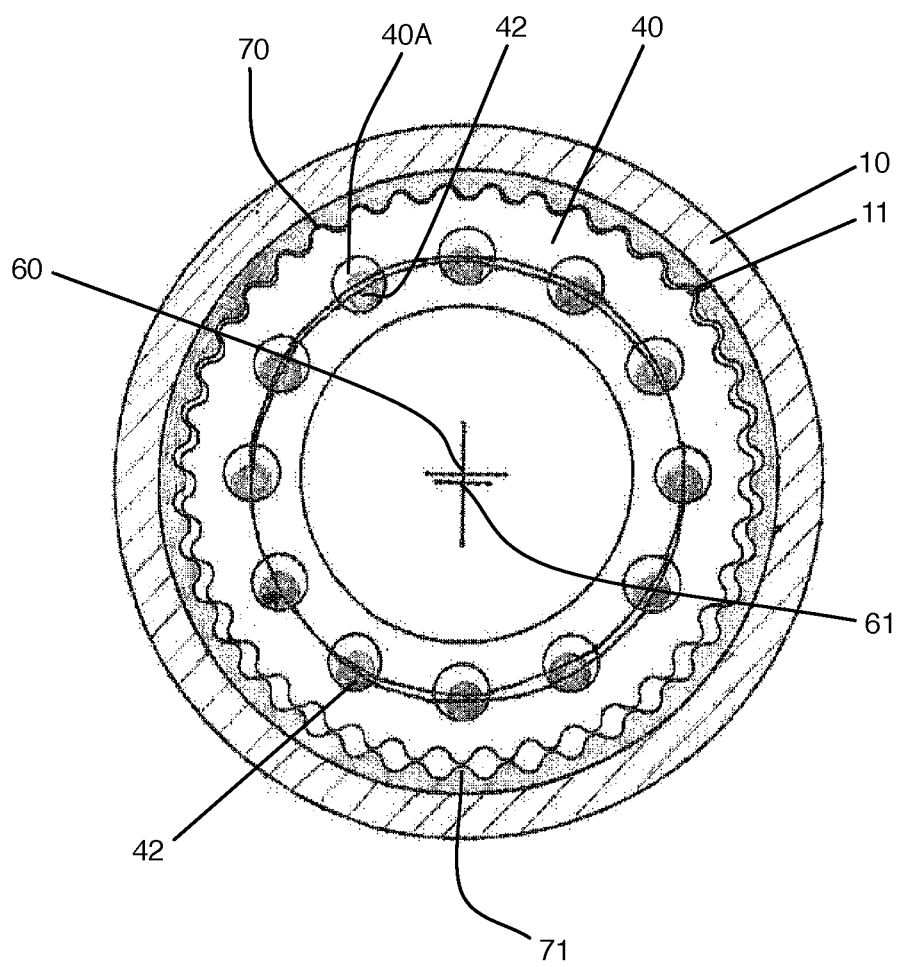
FIG. 5 is a perpendicular cross section showing the interaction of a cycloid gear with housing gear teeth.

FIG. 5 is a partial axial cross section B-B of the mechanism of FIG. 1, as assembled. FIG. 5 illustrates the offset between centerline 60 of cycloid gear 40, and centerline 61 of housing 10. Cycloid gear centerline 60 is offset slightly from housing centerline 61, and during operation, cycloid gear centerline 60 rotates around housing centerline 61 by virtue of the eccentric camshaft lobe on which cycloid gear 40 is mounted. The offset of cycloid gear centerline 60, combined with the smaller diameter of cycloid gears 40 and 41 relative to housing gear teeth 11, causes one side of cycloid gear 40 to mesh with housing gear teeth 11 (region 70), while lifting the opposite side of cycloid gear 40 free from housing gear teeth 11 (region 71). Pins 42 are shown within oversized cycloid gear pin apertures 40A, tangent to cycloid gear 40.

Housing 10 has n number of gear teeth 11. Cycloid gears 40 and 41 each have m number of teeth, of comparable size. The cycloid gears have one or more fewer teeth than housing 10, thereby correlating with the smaller circumference of the cycloid gears relative to gear teeth portion 11 of housing 10. As camshaft 50 (not shown) rotates under motor power, the cycloid gears roll around the housing and must rotate about their axes with a rate equal to (m−n)/m. The output pins 42 are located concentrically about the central axis of housing 10 and are acted upon by cycloid gears 40 and 41 as they rotate. Output pins 42 do not receive any impact or force resulting from the eccentricity of camshaft 50, but will be forced into rotation around the housing centerline 61 as the cycloid gears 40 and 41 rotate about their respective centerlines 60. The pins 42 force input carrier 43 and output carrier 44 into rotation about the housing centerline 61.

Figure 6:
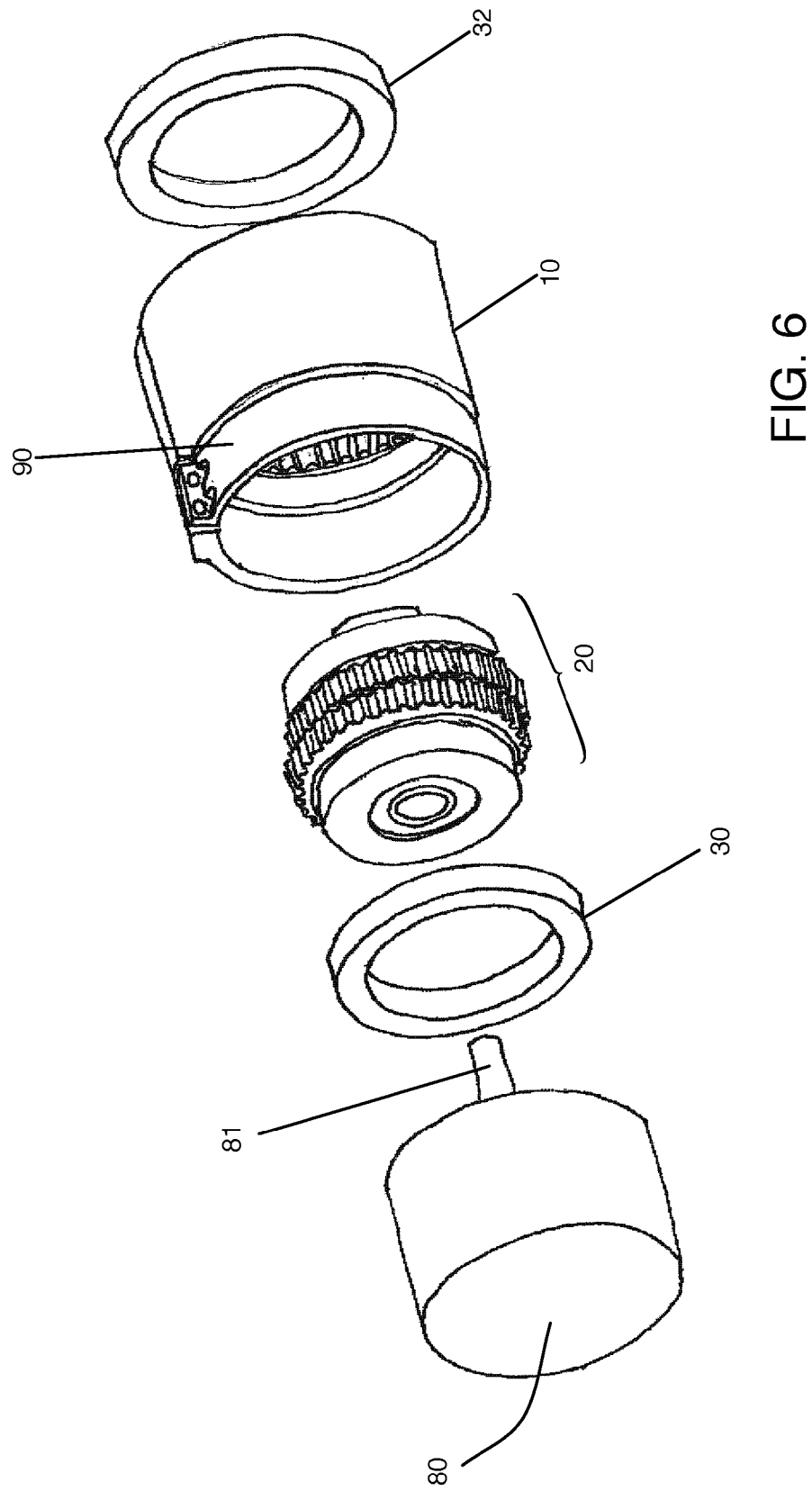
FIG. 6 is an exploded view of a drive unit, engaged with an electric motor.

FIG. 6 shows an exploded view of the assembly of FIG. 1, further illustrating engagement of an electric motor. Eccentric cage assembly 20 is inserted into housing 10 axially and supported by ball bearings 30 and 32. Electric motor 80 includes output shaft 81. Output shaft 81 is inserted axially into, and engages with, central cavity 55 of camshaft 50. Clamp 90, which may be integrated with housing 10, serves to locate and secure motor 80 relative to housing 10. In other embodiments, other means may be used to locate motor 80 to housing 10 and prevent rotation of the motor as a whole, relative to the housing, such as a mounting plate affixed to the input side of the assembly. Meanwhile, the output load (such as a chain drive or other input to a light vehicle drivetrain) is affixed directly to output carrier 44

Figure 7:
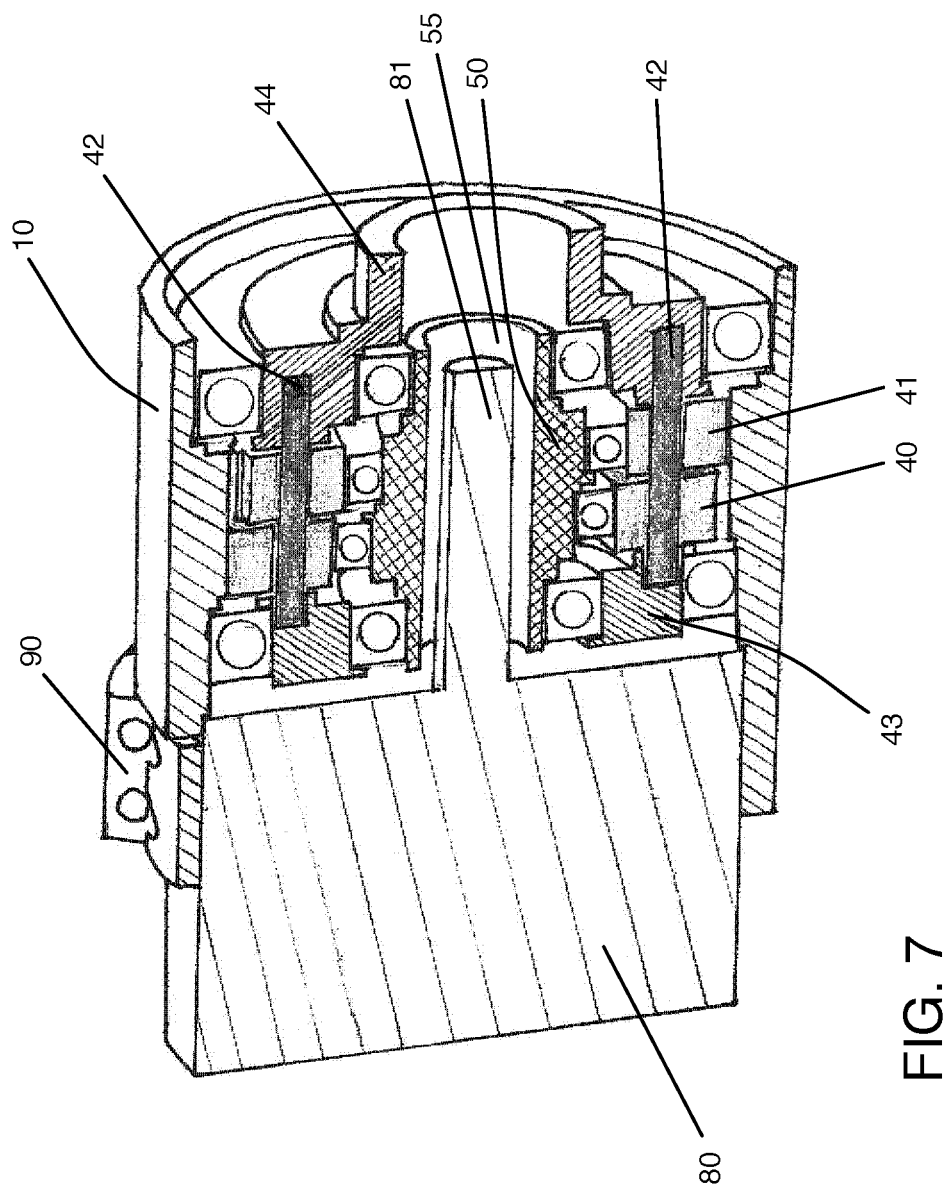
FIG. 7 is a perspective longitudinal cross-sectional cutaway view of a drive unit, engaged with an electric motor.

FIG. 7 is a perspective cutaway view of cross section C-C, of the assembled motor, eccentric cage assembly and housing. Electric motor 80 is shown installed in housing 10 and secured by integrated clamp 90. Not shown in FIG. 7 is a specific method of transmitting torque between electric motor output shaft 81 and camshaft 50. Mechanisms known in the art for interconnecting a motor with a camshaft or other driven device may be utilized, such as a square or Woodruff key on electric motor output shaft 81 mating with a matching keyhole in central aperture 55 of camshaft 50.

Another mechanism for interconnecting electric motor output shaft 81 with camshaft 50, which is preferred, is a one-way clutch bearing pressed into central aperture 55 of camshaft 50. The one-way clutch is oriented such that rotation of electric motor output shaft 81 causes proper rotation of output carrier 44 to provide forward motion to the bicycle, motorcycle or other vehicle on which the assembly is mounted. An example of a one-way clutch bearing is illustrated in the embodiment of FIG. 12. Such use of a one-way clutch may be advantageous in implementing regenerative breaking functionality. Embodiments of the drive unit, as illustrated, may not be efficient when back-driven, thereby limiting the effectiveness of using the gear train to backdrive the electric motor for regenerative braking purposes. By using the one-way clutch between motor shaft 81 and cam shaft 50, the motor shaft can be freely counter rotated without back driving the gear train. For example, an external connection may be provided between, e.g., the chain or belt drive (e.g. belt 138 in FIG. 11) to counter rotate the motor shaft.

Figure 8:
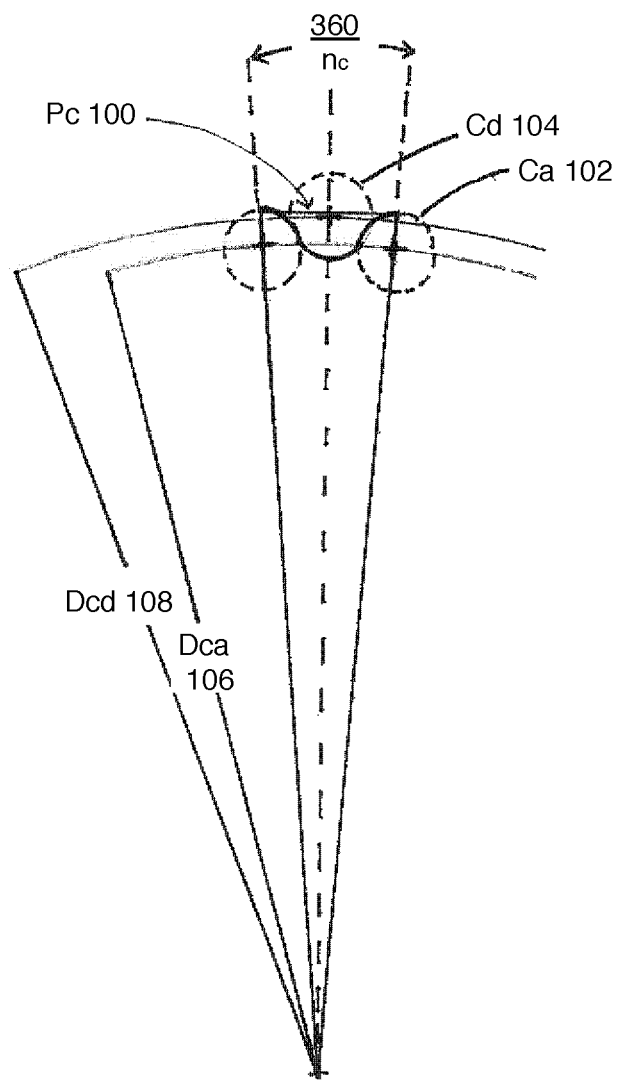
FIG. 8 is a schematic diagram illustrating an external tooth profile of a cycloid gear.

FIG. 8 illustrates dimensions of concern in constructing the external tooth profile of the cycloid gears. The diameter of the cycloid is determined by the gear pitch chosen ($P_C$ 100) multiplied by the chosen number of teeth. $P_C$ 100 is the peak to peak dimension of the cycloid's protruding teeth, known as the addenda. The valleys between the protruding teeth are known as the dedenda. The diameter of the cycloid addenda is defined as $C_a$ 102 while the cycloid's dedenda diameter is defined to be $C_d$ 104. All cycloid addenda are located on a circle with diameter $D_{Ca}$ 106 while the cycloid dedenda are located on diameter $D_{Cd}$ 108. $D_{Ca}$ 106 and $D_{Cd}$ 108 are not equal with $D_{Cd}$ 108 being larger than $D_{Ca}$ 106 and neither lie on the pitch diameter of the cycloid gear. The difference in addenda and dedenda pitch circles, $D_{cd}-D_{ca}$, may vary and is most preferably between $0.02D_{Ca}$-$0.2D_{Ca}$ and most preferably in the range of $0.02D_{Ca}$-$0.06D_{Ca}$ with about 0.04 $D_{Ca}$ being optimal in some applications. The difference between cycloid dedenda and addenda diameters, $C_d$-$C_a$, may vary and is preferably between $0.02C_a$-$0.2C_a$ with about $0.15C_a$ being optimal in some applications.

Both the addenda ($C_a$) and dedenda ($C_d$) are defined by circles. They are tangentially connected and their centers lie on circles with the diameters $D_{Cd}$ and $D_{Ca}$ which lie on a common center. The angle between adjacent addenda peaks or dedenda valleys is $360/N_C$, where $N_C$ is the number of teeth on the cycloid gear. The cycloid gear pitch is defined as the linear distance between addenda peaks.

Figure 9:
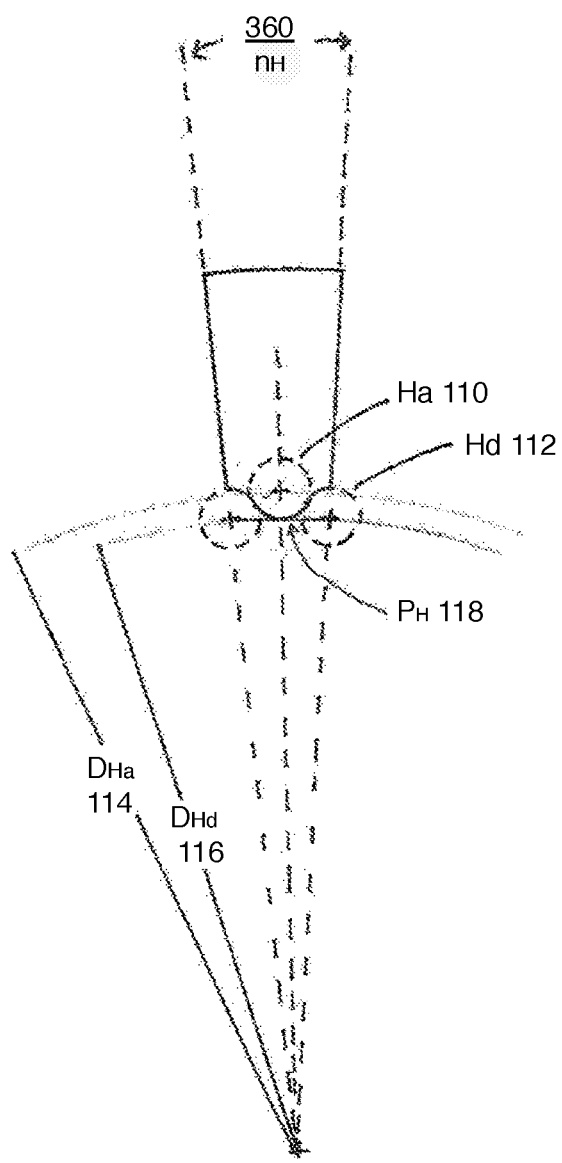
FIG. 9 is a schematic diagram illustrating an internal tooth profile of a housing.

FIG. 9 shows corresponding dimensions for defining the internal gear tooth profile for housing gear teeth 11. The diameter of the addenda of the housing is defined as $H_a$ 110 and the dedenda diameter is $H_d$ 112. All addenda lie on a circle with diameter $D_{Ha}$ 114 and all dedenda lie on a circle with diameter $D_{Hd}$ 116. $D_{Ha}$ 114 is larger than $D_{Hd}$ 116 by a variable amount, preferable $0.02D_{Ha}$-$0.1D_{Ha}$ with about $0.04D_{Ha}$ being optimal in some applications. The difference in addenda and dedenda diameters, $H_a$-$H_d$, may vary and is preferably $0.02H_a$-$0.1H_a$ with about $0.06H_a$ being optimal in some applications. The addenda and dedenda circles are tangentially connected. $P_H$ 118 is the gear pitch of the housing defined as the linear distance between addenda centers. While FIGS. 8 and 9 describe preferred dimensions for cycloid gear and housing gear teeth, it is understood that other embodiments may feature alternative dimensions and configurations of gear teeth.

Figure 10:
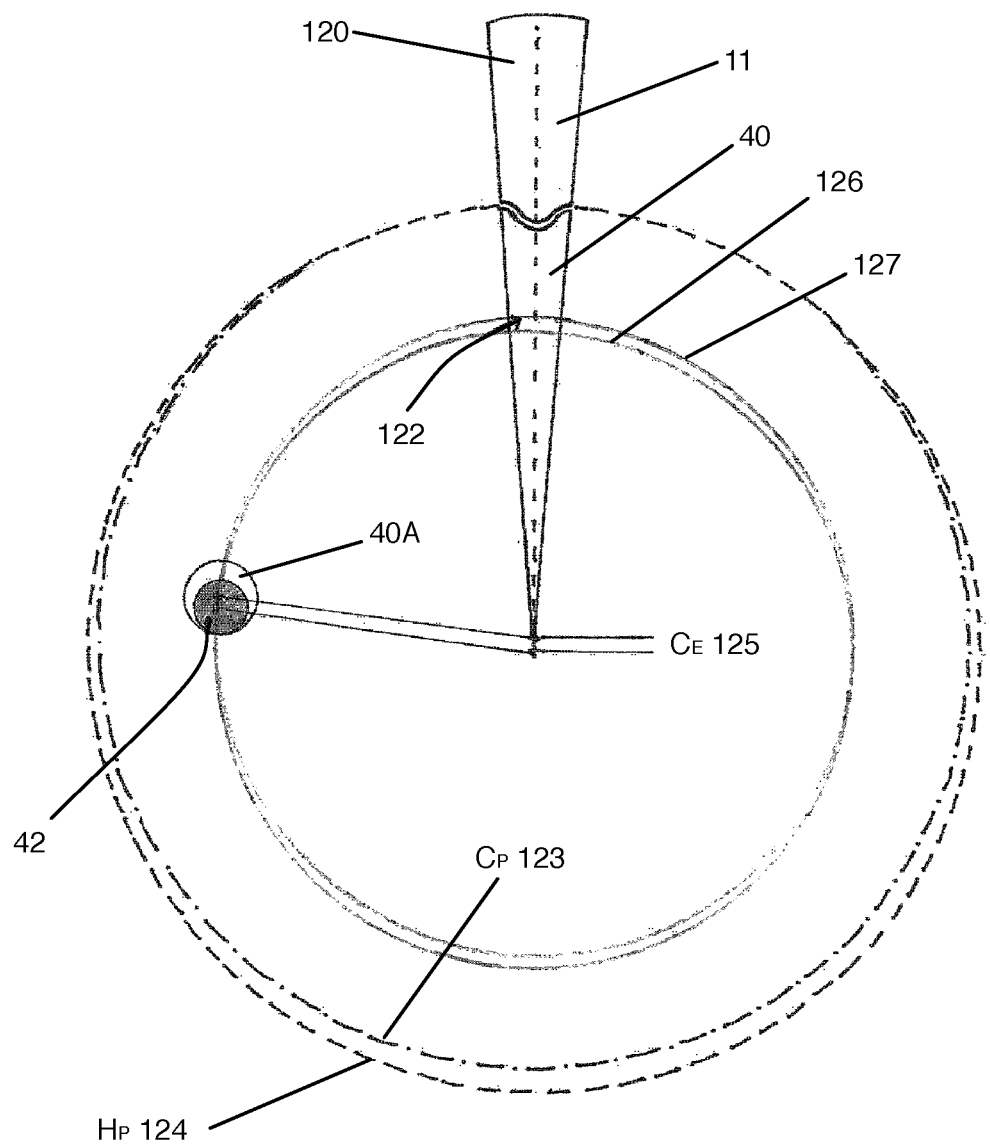
FIG. 10 is a schematic diagram of the eccentric relationship between a cycloid gear and a housing.

FIG. 10 is an axial, partial cutaway view showing engagement of one gear tooth between a cycloid gear and housing gear teeth. Housing tooth 120 is one of housing gear teeth 11, and is shown in relation to cycloid tooth 122 of cycloid gear 40. CP measurement 123 is the diameter of the cycloid gear pitch circle while HP measurement 124 is the diameter of the housing pitch circle. The gear mesh between cycloid tooth 122 and housing tooth 120 is caused by the offset CE measurement 125, the cycloid eccentricity. This distance is set by the eccentric lobes of camshaft 50, on which cycloid gear 40 is mounted, and brings the pitch circles of housing 10 and cycloid gear 40 into contact.

Also shown is the relationship between the cycloid gear 40, cycloid gear aperture 40A, output pin 42 and the centerline of housing 10. Cycloid gear 40 may have any number of cycloid apertures 40A, only one is shown here for clarity. FIG. 2 shows output pins 42 concentrically located on the output carrier 44, which is held concentrically in housing 10. The pitch circle of the pins is denoted with PH (reference numeral 126) while the cycloid holes lie on circle PC (reference numeral 127). In the illustrated embodiment, if the diameter of output pins 42 is defined as DP, the diameter of cycloid apertures 40A is specified by the relation DP+2CE. FIG. 10 shows how the cycloid eccentricity, CE 125, maintains tangential contact between output pins 42 and cycloid apertures 40A. As cycloid gear 40 is forced to rotate about its axis by the meshing with housing gears 11 and housing 10, this rotation is transferred to output pins 42 while the off-axis wobble of cycloid gear 40 is not.

Figure 11:
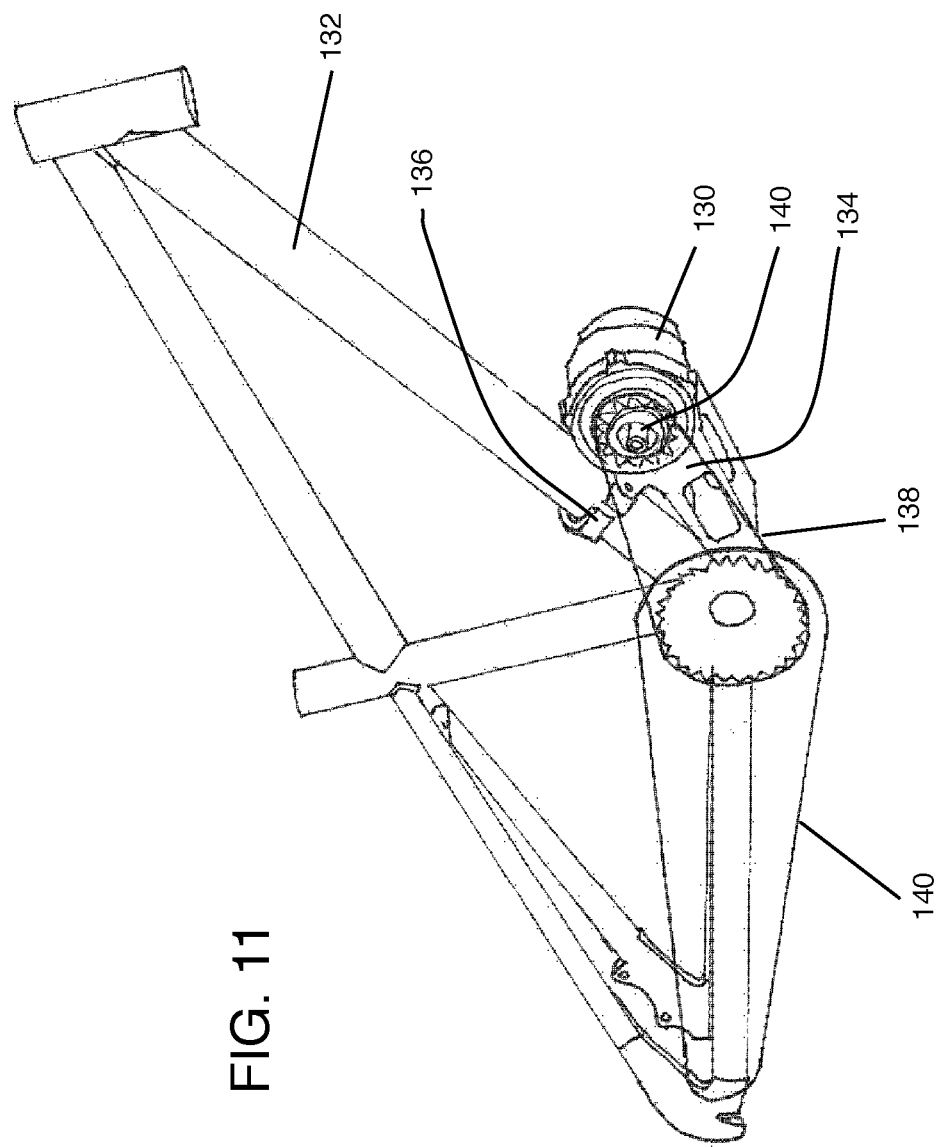
FIG. 11 is a perspective view of a bicycle frame having an electric drive unit installed thereon and coupled with a bicycle drive train.
Figure 12:
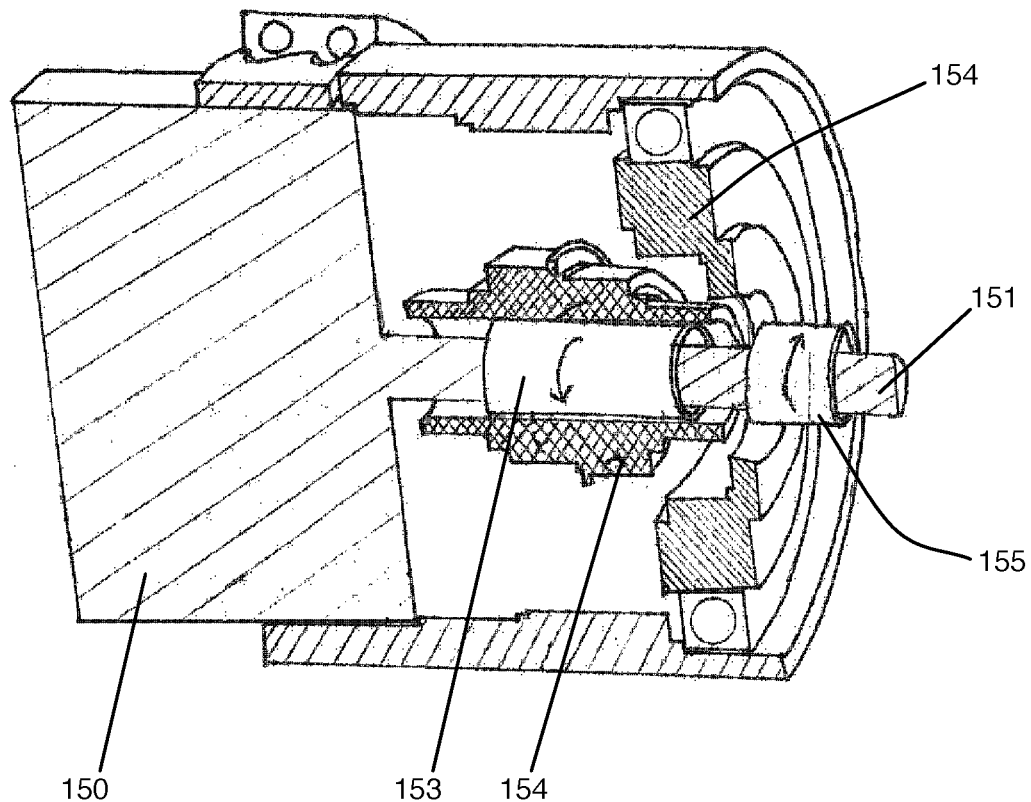
FIG. 12 is a perspective cutaway longitudinal cross section of a drive unit having one-way clutch bearings for regenerative braking.

FIG. 11 illustrates a possible arrangement for powering a bicycle with the drive unit described herein. Drive unit 130 is attached to bicycle frame 132 by the use of mounting plates 134 and frame clamp 136. Drive unit 130 transmits rotational force by chain or belt 138 (attached to the output carrier 140 of the drive unit eccentric assembly) to bicycle drivetrain 140. For example, in a chain drive application, a first sprocket can be mounted to the drive unit output carrier; a second sprocket can be mounted to a bicycle pedal crank assembly; and a chain extending around the first and second sprockets enables application of power from the drive unit to the pedal assembly. Similarly, in a belt drive application, a first pulley can be mounted to the drive unit output carrier; a second pulley can be mounted to a bicycle pedal crank assembly; and a belt extending around the first and second pulleys enables application of power from the drive unit to the pedal assembly. Because drive unit 130 directly powers bicycle drivetrain 140, drive unit 130 can take advantage of user gear selection, and also potentially provide varying levels of power assist to supplement a rider's own motive power.

The mechanism described herein can be implemented to provide a relatively powerful, reliable and light-weight electric drive unit that may be particularly desirable for use in light weight vehicles, such as a bicycle, where minimizing the weight of the propulsion system is important to performance and user satisfaction. However, another important component of system size and weight is the electric power source utilized to power electric motor 80. In some embodiments, it may be desirable to utilize portable battery packs to power motor 80. Battery packs feature varying power density, cost and recharging characteristics. Therefore, different battery packs may be desirable in different applications. For example, in a high performance electrical bicycle application, it may be desirable to utilize a battery pack with a high power density, such as Lithium Polymer chemistries. In an application intended for daily use on a bicycle, it may be desirable to utilize safer battery packs such as Lithium-Ion chemistries. In some embodiments, the battery pack may be mounted to or within the frame of a bicycle, light electric vehicle or other device with which the drive unit is used. In some embodiments, the battery pack may be carried, such as within a backpack worn by an individual riding a bicycle powered by the electric drive unit described herein, the battery pack supplying power to the electric motor via conductive cables.

Because portability concerns may impact battery size and weight, it may be desirable to implement features to extend the life of system battery packs. One mechanism to doing so it regenerative braking. Regenerative braking is a technique in which energy is extracted from the mechanism components that are braked, to be stored and re-used. In the context of a battery-powered light electric vehicle, regenerative braking may be utilized to re-charge batteries during deceleration of the vehicle.

FIG. 12 illustrates an embodiment of the drive unit described herein, with integrated regenerative braking capabilities. Electric motor 150 is powered to spin motor output shaft 151. Motor output shaft 151 drives cam shaft 152. A one-way bearing or sprag clutch 153 is used to transmit torque in a counter-clockwise direction from electric motor 150 to the camshaft 152. Drive unit output carrier 154 is forced into a clockwise rotation due to the reduction within the unit. The electric motor output shaft 151 extends through the drive unit and is attached to the external load by a second one-way bearing or sprag clutch 155 arranged in the opposite direction as clutch 153. When the drive unit is not under electric power, the external load is acting on the regenerative bearing 155 in the clockwise direction causing reverse rotation of the electric motor 150 to recharge a battery connected to motor 150, thereby providing regenerative braking functionality.

Figure 13:
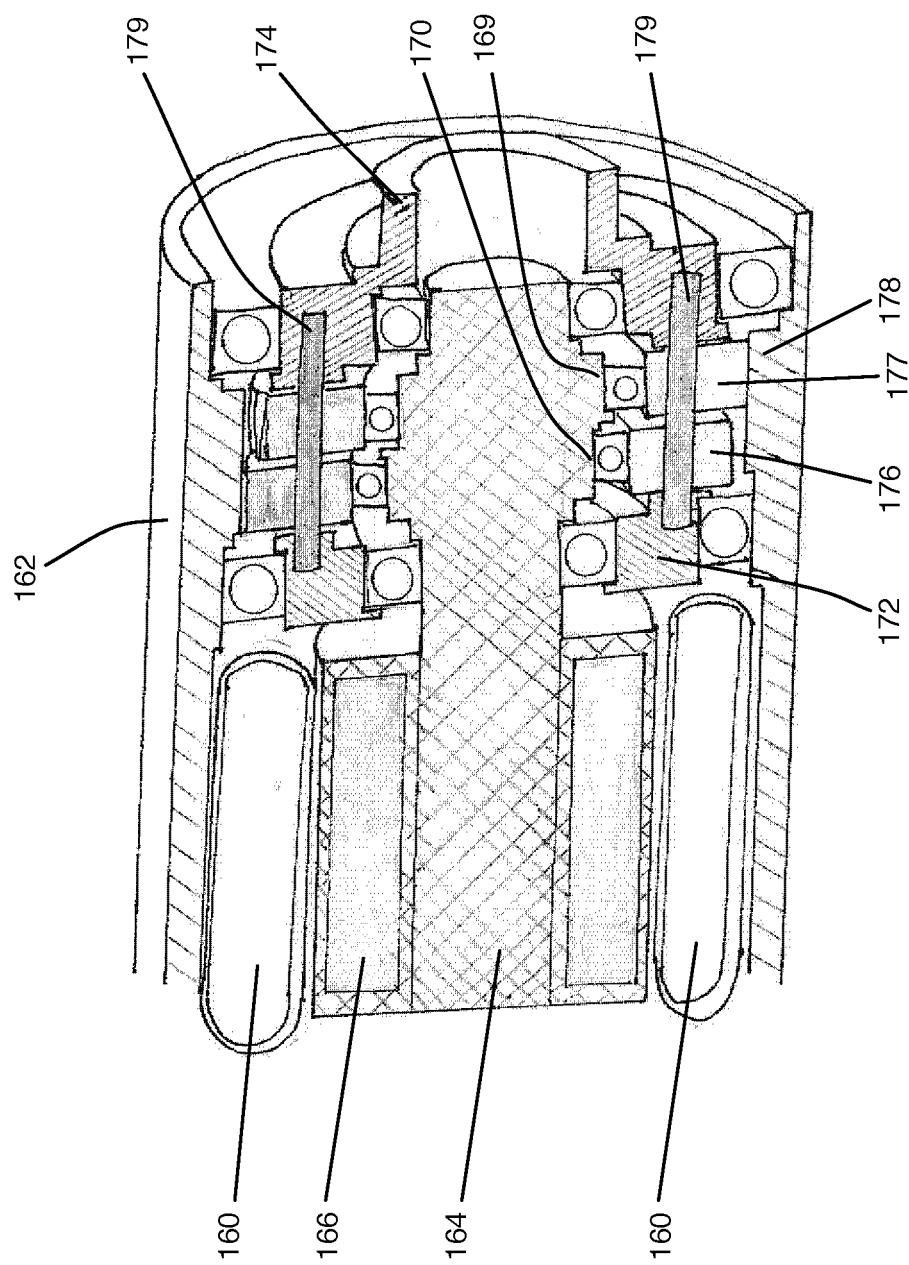
FIG. 13 is a perspective cutaway longitudinal cross section of a drive unit with electric motor having a cam shaft integrated with the electric motor output shaft.

FIG. 13 is a longitudinal cross-section illustrating integration of an electric motor and drive unit, in accordance with another embodiment. The electric motor stator 160 is installed in drive unit housing 162. Stator 160 is affixed to housing 162 by an appropriate means, such as an adhesive and/or interference fit. The shaft 164 of the electric motor rotor 166 is turned to form an integrated camshaft portion 168, including eccentric lobes 169 and 170. Rotor 164 is supported within housing 162 by input carrier 172 and output carrier 174. Cycloid gears 176 and 177 engage with housing gear teeth 178 to drive output pins 179, analogously to previously-described embodiments.

Amongst the factors that may be important in successfully implementing the electric drive unit described herein is ensuring effective lubrication. Effective lubrication can help minimize, or at least control, component wear and heat build up during use. While the enclosed housing in the above-described embodiments can act to contain oil or other lubricants applied to the cycloid gears, cam shaft and other components, in other embodiments, modifications may be made to further improve component lubrication.

Figure 14:
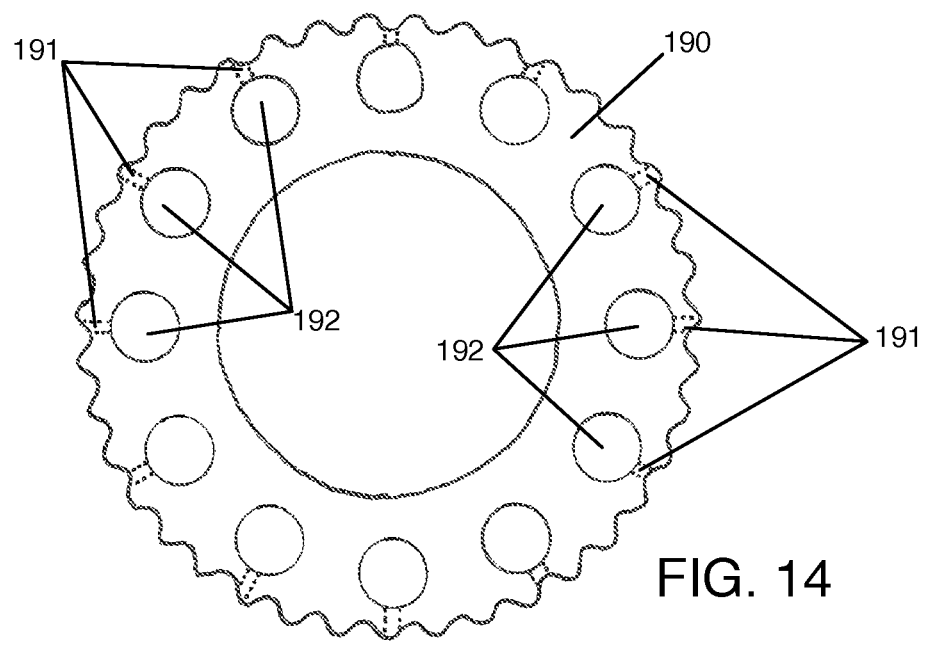
FIG. 14 is an elevation of a cycloid gear having lubrication channels.
Figure 15:
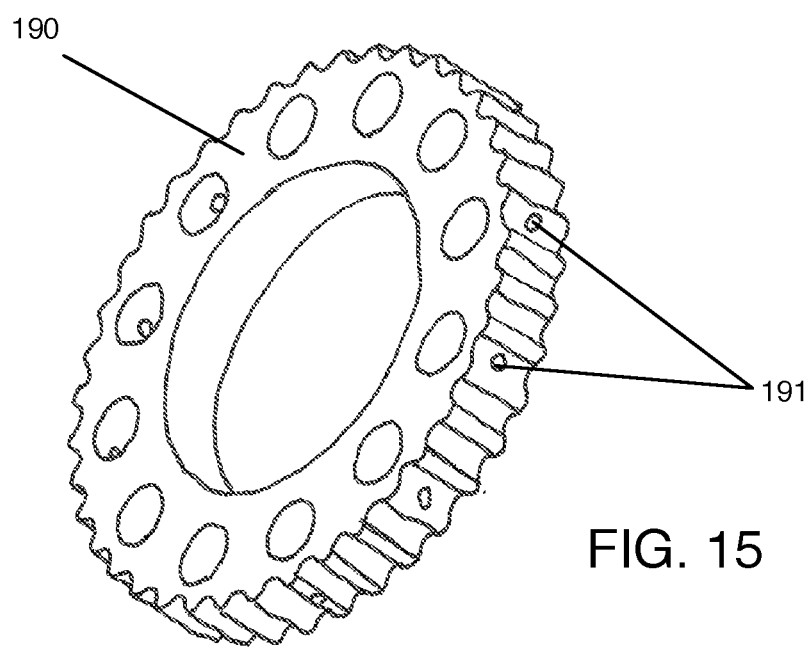
FIG. 15 is a perspective view of a cycloid gear having lubrication channels.

One such mechanism for improving component lubrication involves providing lubrication channels within the cycloid gears. FIG. 14 is a side elevation of cycloid gear 190 having lubrication channels through the gear faces. FIG. 15 is a perspective view of cycloid gear 190. The design of cycloid gear 190 can be used interchangeably with, e.g., cycloid gears 40 and 41 of previously-described embodiments. Lubrication channels 191 pass radially through each of the gear faces, connecting output pin apertures 192 to a grease reservoir formed as a result of gaps between the non-conjugate gear profiles of the cycloid gears and housing gear teeth (as illustrated in, e.g., region 71 of FIG. 5). As cycloid gear 190 rotates within the housing, grease or oil retained in the housing gear teeth is pushed into the lubrication channel 191 by virtue of a pumping action driven by the interaction of the cycloid gear with housing gear. The grease or oil makes its way through channels 191 to the output pins that pass through output pin apertures 192, thereby decreasing wear and noise. These lubrication channels 191 aid in creating a circulating path for lubrication within the drive unit by using the motion of the cycloid gears 190 to pump lubrication towards the spinning center of the drive unit, where centrifugal forces will return the lubrication to the gear faces for re-use.

Additionally, the drive unit's unique gear profile allows placement of the output pin apertures 192 (and therefore the output pins passing therethrough) very close to the gear faces of cycloid gear 190. This relatively short distance enables the lubrication channels 191 to function using only motion of the cycloid gear to force grease or oil from the reservoirs in the housing tooth profile through the short path to the output pins.

The lubrication channels 191 are oriented radially on the cycloid gear as shown in FIGS. 14 and 15. The channels are perpendicular to both the cycloid gear faces and the output pin holes. The preferred method is a single channel midline on the cycloid gear, one per output pin, however any number of channels in any arrangement may be used in order to effectively force lubrication through the channel to the output pins using the movement of the cycloid gear.

While certain embodiments of the invention have been described herein in detail for purposes of clarity and understanding, the foregoing description and Figures merely explain and illustrate the present invention and the present invention is not limited thereto. It will be appreciated that those skilled in the art, having the present disclosure before them, will be able to make modifications and variations to that disclosed herein without departing from the scope of the invention or appended claims.

The invention claimed is:

1. An electric drive unit for a light electric vehicle powered by an electric motor, the drive unit comprising:
an input carrier and an output carrier, each having an inward-oriented face with a plurality of receptacles formed therein;
a plurality of output pins, each extending from an input carrier receptacle to an output carrier receptacle;
one or more cycloid gears, each having a plurality of apertures through which the plurality of output pins pass;
the one or more cycloid gears each having gear teeth around their peripheries;
the one or more cycloid gears, each further having a central aperture through which a cam shaft passes, the cam shaft having a lobe driving each of the one or more cycloid gears;
a housing surrounding the one or more cycloid gears, having a plurality of gear teeth on an inside surface, the housing further having an inner diameter that exceeds an outer diameter of the one or more cycloid gears such that a proper subset of the cycloid gear teeth engage the housing gear teeth at any given time; and
an electric motor driving the cam shaft;
whereby the output carrier can be coupled to a light electric vehicle drivetrain in order to power the light electric vehicle.

2. The electric drive unit of claim 1, further comprising a battery pack connected to the electric motor.

3. The electric drive unit of claim 1, further comprising a drive chain extending around a first sprocket and a second sprocket, where the first sprocket is mounted to the output carrier, and the second sprocket is mounted to a pedal crank assembly; whereby the electric drive unit can apply power to the pedal crank assembly.

4. The electric drive unit of claim 1, further comprising a drive belt extending around a first pulley and a second pulley, where the first pulley is mounted to the output carrier, and the second pulley is mounted to a pedal crank assembly; whereby the electric drive unit can apply power to the pedal crank assembly.

5. The electric drive unit of claim 1, in which the electric motor comprises an output shaft, the drive unit further comprising:
a first one way bearing between the electric motor output shaft and the cam shaft;
a second one way bearing having a direction of rotation opposite that of the first one way bearing, the second one way bearing coupling the output carrier with the light electric vehicle drivetrain;
whereby the electric vehicle drivetrain can act on the electric motor to provide regenerative braking when not under electric power.

6. The electric drive unit of claim 1, in which the cam shaft comprises an integrated electric motor output shaft.

7. The electric drive unit of claim 1, in which the one or more cycloid gears each further comprise one or more lubrication channels, each lubrication channel extending between a surface of one or more gear teeth and a cycloid gear output pin aperture.

8. The electric drive unit of claim 7, in which the one or more cycloid gears each include at least one lubrication channel for each output pin aperture.

9. The electric drive unit of claim 1, in which:
the one or more cycloid gears comprise a first cycloid gear and a second cycloid gear;
the camshaft comprises a first eccentric lobe driving the first cycloid gear, and a second eccentric lobe driving the second cycloid gear, the first eccentric lobe and the second eccentric lobe having relative phases balancing the electric drive unit.

10. The electric drive unit of claim 9, in which the one or more cycloid gears consist of two cycloid gears; and in which the first eccentric lobe and the second eccentric lobe have relative phases offset by approximately 175 degrees.

11. The electric drive unit of claim 1, in which the cycloid gear teeth and the housing gear teeth having a modified circular profile.

12. The electric drive unit of claim 1, in which the one or more cycloid gears each have addenda and dedenda diameters which differ by an amount ranging from 0.02 to 0.1 times the cycloid gear addenda diameter.

13. The electric drive unit of claim 12, in which the cycloid gear addenda and dedenda diameters are on pitch circles which differ by a distance ranging from 0.02 to 0.2 times the cycloid addenda diameter.

14. The electric drive unit of claim 1, in which the housing gear teeth have addenda and dedenda diameters which differ by an amount ranging from 0.02 to 0.1 times the housing gear addenda diameter.

15. The electric drive unit of claim 14, in which the housing gear addenda and dedenda diameters are on pitch circles which differ by a distance ranging from 0.02 to 0.2 times the housing addenda diameter.

16. The electric drive unit of claim 14, in which the housing gear addenda and dedenda diameters are on pitch circles which differ by a distance ranging from 0.02 to 0.06 times the housing addenda diameter.

17. The electric drive unit of claim 14, in which the housing gear addenda and dedenda diameters are on pitch circles which differ by a distance of about 0.04 times the housing addenda diameter.

18. The electric drive unit of claim 7, in which the one or more cycloid gears each have an eccentricity less than 0.05 times their radius, the radius defined as the gear pitch times the number of gear teeth; and in which the plurality of apertures through which the output pins pass lie on a pitch diameter such that the cycloid apertures are less than half their diameter from the surface of the gear face, defined as the cycloid dedenda pitch diameter minus the diameter of the dedenda, whereby that the lubrication channels are short in length.

19. The electric drive unit of claim 1, in which one or more of the output pins includes a threaded portion, and one or more of the receptacles formed in the output carrier or input carrier are threaded, such that a threaded output pin can be screwed into a threaded carrier to secure the assembly together.

20. An electrically-powered bicycle comprising:

a frame;

a drive unit mounted to the frame, the drive unit comprising:

an input carrier and an output carrier, each having an inward-oriented face with a plurality of receptacles formed therein;

a plurality of output pins, each extending from an input carrier receptacle to an output carrier receptacle;

one or more cycloid gears, each having gear teeth around their peripheries and a plurality of apertures through which the plurality of output pins pass;

the one or more cycloid gears each further having a central aperture through which a camshaft passes, the cam shaft having a lobe driving each cycloid gear;

a housing surrounding the one or more cycloid gears, having a plurality of gear teeth on an inside surface, the housing further having an inner diameter that exceeds an outer diameter of the one or more cycloid gears;

an electric motor driving the cam shaft;

the bicycle further comprising a drivetrain, and a coupler interconnecting the output carrier with the drivetrain.

21. The electrically-powered bicycle of claim 20, in which the coupler comprises a chain drive.

22. The electrically-powered bicycle of claim 20, in which the coupler comprises a belt drive.

23. The electrically-powered bicycle of claim 20, further comprising a battery pack supplying power to the electric motor.

24. The electrically-powered bicycle of claim 23, in which the electric motor comprises an output shaft, the bicycle further comprising:

a first one way bearing between the electric motor output shaft and the cam shaft;

a second one way bearing having a direction of rotation opposite that of the first one way bearing, the second one way bearing interconnecting the output carrier with the coupler;

whereby the drivetrain can act on the electric motor to provide regenerative braking when not under electric power.

* * * * *